United States Patent
Huang et al.

(10) Patent No.: US 11,899,301 B2
(45) Date of Patent: Feb. 13, 2024

(54) PHOTOSENSITIVE COLOR-CHANGING TOUCH CONTROL DISPLAY DEVICE

(71) Applicant: HUIZHOU CHINA STAR OPTOELECTRONICS TECHNOLOGY CO., LTD., Guangdong (CN)

(72) Inventors: Dongchen Huang, Guangdong (CN); Chingyuan Cheng, Guangdong (CN)

(73) Assignee: HUIZHOU CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 725 days.

(21) Appl. No.: 16/967,424

(22) PCT Filed: Jul. 14, 2020

(86) PCT No.: PCT/CN2020/101965
§ 371 (c)(1),
(2) Date: Aug. 5, 2020

(87) PCT Pub. No.: WO2021/248620
PCT Pub. Date: Dec. 16, 2021

(65) Prior Publication Data
US 2023/0146459 A1    May 11, 2023

(30) Foreign Application Priority Data
Jun. 12, 2020  (CN) .......... 202010536614.7

(51) Int. Cl.
G02F 1/1333    (2006.01)
G06F 3/041     (2006.01)

(52) U.S. Cl.
CPC ........ *G02F 1/13338* (2013.01); *G06F 3/0412* (2013.01)

(58) Field of Classification Search
CPC ...... G06F 3/041–047; G06F 2203/041–04114; G06F 3/0412;
(Continued)

(56) References Cited

U.S. PATENT DOCUMENTS 9,632,587 B2    4/2017  Duan
10,386,958 B2   8/2019  Xu et al.
(Continued)

FOREIGN PATENT DOCUMENTS

CN    103729096 A    4/2014
CN    104503635 A    4/2015
(Continued)

*Primary Examiner* — Sanjiv D. Patel
(74) *Attorney, Agent, or Firm* — SOROKER AGMON NORDMAN RIBA

(57) ABSTRACT

A photosensitive color-changing touch control display device includes a display panel, a photosensitive color-changing touch control panel, a driving chip, and a central processing unit. The photosensitive color-changing touch control panel includes a plurality of touch control electrodes and a plurality of photoresistors. When a resistance of the photoresistor changes, the driving chip transmits the obtained current change signal to the central processing unit, and the central processing unit controls the display panel corresponding to a region where a current change occurs to change color.

16 Claims, 3 Drawing Sheets

(58) Field of Classification Search
CPC ......... G06F 3/0421; G06F 2203/04104; G06F 3/0304; G06F 3/042; G06F 2203/04109; G02F 1/13338; G02F 1/13306; H10K 59/40
See application file for complete search history.

(56) References Cited

U.S. PATENT DOCUMENTS

| | | | |
|---|---|---|---|
| 10,930,688 B2 | 2/2021 | Chu et al. | |
| 2013/0055080 A1 | 2/2013 | Komer et al. | |
| 2014/0176827 A1* | 6/2014 | Gollier | G02F 1/133502 359/488.01 |
| 2019/0187853 A1* | 6/2019 | Ding | G06F 3/016 |

FOREIGN PATENT DOCUMENTS

| | | | |
|---|---|---|---|
| CN | 105785697 A | | 7/2016 |
| CN | 107037926 A | | 8/2017 |
| CN | 108333812 A | | 7/2018 |
| CN | 109426388 A | | 3/2019 |
| CN | 109976596 | * | 5/2019 |
| CN | 109976595 A | | 7/2019 |
| CN | 110794613 A | | 2/2020 |
| CN | 111766974 A | | 10/2020 |
| CN | 111766976 A | | 10/2020 |
| JP | 2019095686 A | | 6/2019 |
| KR | 20180021484 | * | 3/2018 |
| WO | WO-2021093100 A1 * | | 5/2021 ......... G02F 1/13306 |

\* cited by examiner

PHOTOSENSITIVE COLOR-CHANGING TOUCH CONTROL DISPLAY DEVICE

FIELD OF INVENTION

The present disclosure relates to the field of display technology, and more particularly, to a photosensitive color-changing touch control display device.

BACKGROUND OF INVENTION

Large-size liquid crystal display devices in commercial display application, especially in a field of conference integrated machines and electronic whiteboards, have a wide market demand. For conference integrated machines and electronic whiteboards, liquid crystal display devices are required to meet multi-functional requirements. Firstly, in conference scenes or educational scenes under ambient light, the liquid crystal display devices have a good wide-angle visibility to realize meeting interaction. Secondly, conference panels need to have touch control function in the conference scenes to realize conference interaction. Thirdly, in a conference industry and an education industry, users want to have a visual effect of laser pointer to realize a function of teaching pointer. However, traditional TV display modules have difficulty in achieving the above multimedia effects.

Therefore, current liquid crystal display technology urgently needs to be improved.

SUMMARY OF INVENTION

An embodiment of the present disclosure provides a photosensitive color-changing touch control display device to solve a technical problem that current display panel cannot meet multi-function requirements of a touch control function and a laser pointer with a visual effect at the same time in conference scenes or an educational scene.

In order to solve the above problems, technical solutions provided by the present disclosure are as follows.

The embodiment of the present disclosure provides a photosensitive color-changing touch control display device. The photosensitive color-changing touch control display device comprises a display panel, a photosensitive color-changing touch control panel, a driving chip, and a central processing unit. The photosensitive color-changing touch control panel comprises a plurality of touch control electrodes and a plurality of photoresistors. The driving chip is electrically connected to the photoresistors to obtain a current change signal of the photoresistors. The central processing unit is electrically connected to the driving chip and the display panel. Wherein, when a resistance of the photoresistor changes, the driving chip transmits the obtained current change signal to the central processing unit, and the central processing unit controls the display panel corresponding to a region where a current change occurs to change color. The photosensitive color-changing touch control display device further comprises a polarizer disposed on the photosensitive color-changing touch control panel. The photoresistors and the touch control electrodes are disposed on a same layer.

In at least one embodiment of the present disclosure, the photosensitive color-changing touch control display panel further comprises a base substrate disposed on the display panel, and the plurality of touch control electrodes and the plurality of photoresistors are disposed on the base substrate.

In at least one embodiment of the present disclosure, in a horizontal direction, the photoresistors and the touch control electrodes are alternately arranged on the base substrate.

In at least one embodiment of the present disclosure, the driving chip is further connected to the touch control electrodes to obtain touch signals from the touch control electrodes.

In at least one embodiment of the present disclosure, the photosensitive color-changing touch control display device further comprises a touch control driving chip, the touch control driving chip is connected to the touch control electrodes and the central processing unit, and the touch control driving chip is configured to obtain touch signals from the touch control electrodes.

In at least one embodiment of the present disclosure, the central processing unit further controls the display panel to make a touch feedback display.

In at least one embodiment of the present disclosure, the display panel comprises an array substrate and a color film substrate that are oppositely arranged, and the photoresistors and the touch control electrodes may be disposed in the array substrate or the color film substrate of the display panel.

The embodiment of the present disclosure further provides a photosensitive color-changing touch control display device. The photosensitive color-changing touch control display device comprises a display panel, a photosensitive color-changing touch control panel, a driving chip, and a central processing unit. The photosensitive color-changing touch control panel comprises a plurality of touch control electrodes and a plurality of photoresistors. The driving chip is electrically connected to the photoresistors to obtain a current change signal of the photoresistors. The central processing unit is electrically connected to the driving chip and the display panel. Wherein, when a resistance of the photoresistor changes, the driving chip transmits the obtained current change signal to the central processing unit, and the central processing unit controls the display panel corresponding to a region where a current change occurs to change color.

In at least one embodiment of the present disclosure, the photoresistors and the touch control electrodes are disposed on a same layer.

In at least one embodiment of the present disclosure, the photoresistors and the touch control electrodes are disposed on different layers.

In at least one embodiment of the present disclosure, the photosensitive color-changing touch control display panel further comprises a base substrate disposed on the display panel, and the plurality of touch control electrodes and the plurality of photoresistors are disposed on the base substrate.

In at least one embodiment of the present disclosure, in a horizontal direction, the photoresistors and the touch control electrodes are alternately arranged on the base substrate.

In at least one embodiment of the present disclosure, the photosensitive color-changing touch control display device further comprises a polarizer disposed on the photosensitive color-changing touch control panel.

In at least one embodiment of the present disclosure, wherein the driving chip is connected to the touch control electrodes to obtain touch signals from the touch control electrodes.

In at least one embodiment of the present disclosure, the photosensitive color-changing touch control display device further comprises a touch control driving chip, the touch control driving chip is connected to the touch control electrodes and the central processing unit, and the touch control driving chip is configured to obtain touch signals from the touch control electrodes.

In at least one embodiment of the present disclosure, the central processing unit controls the display panel to make a touch feedback display.

In at least one embodiment of the present disclosure, the display panel comprises an array substrate and a color film substrate that are oppositely arranged, and the photoresistors and the touch control electrodes may be disposed in the array substrate or the color film substrate of the display panel.

In at least one embodiment of the present disclosure, the photoresistors is one of ultraviolet photoresistors, visible light photoresistors, or infrared photoresistors.

In at least one embodiment of the present disclosure, a material of the photoresistors is one of cadmium sulfide, cadmium selenide, lead sulfide, lead telluride, lead selenide, or indium antimonide.

In at least one embodiment of the present disclosure, a backlight module is disposed below the display panel.

A photoresistor is disposed on a substrate with a touch control function to realize a multimedia integrated display panel with a photosensitive color-changing function and a touch control function. When the photoresistor is irradiated by a laser pointer and a resistance changes, by collecting current change information, the driving chip feeds back a position where current change occurs to the central processing unit, and the central processing unit controls the display panel at a corresponding position to change colors. Therefore, a trajectory of a laser pointer irradiation is revealed, and multifunctional applications of liquid crystal display devices in the conference scene or the education scene is realized.

DETAILED DESCRIPTION OF PREFERRED EMBODIMENTS

The present disclosure provides a photosensitive color-changing touch control display device. In order to make a purpose, technical solutions, and effects of the present disclosure clearer, following describes the present disclosure in further detail with reference to accompanying drawings and examples. It should be understood that specific embodiments described herein are only used to explain the present disclosure, and are not used to limit the present disclosure.

Figure 1:
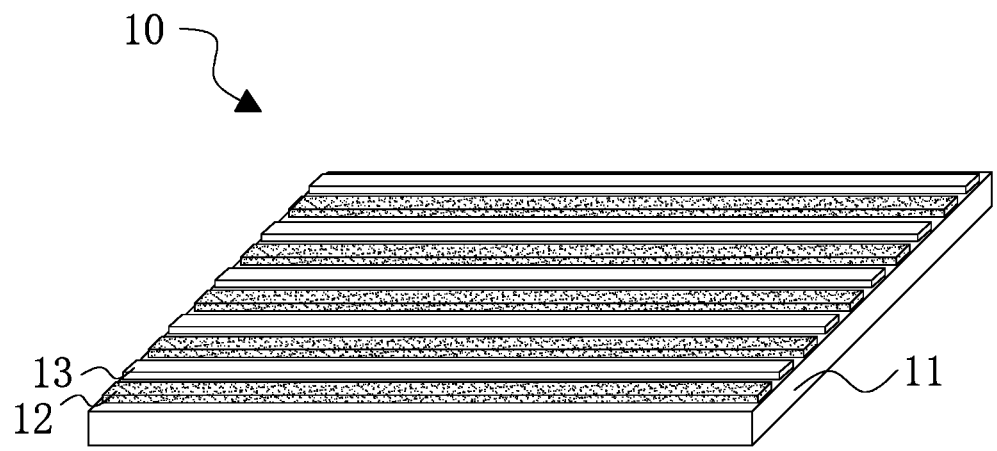
FIG. 1 is a schematic structural diagram of a photosensitive color-changing touch control display panel provided by an embodiment of the present disclosure.
Figure 3:
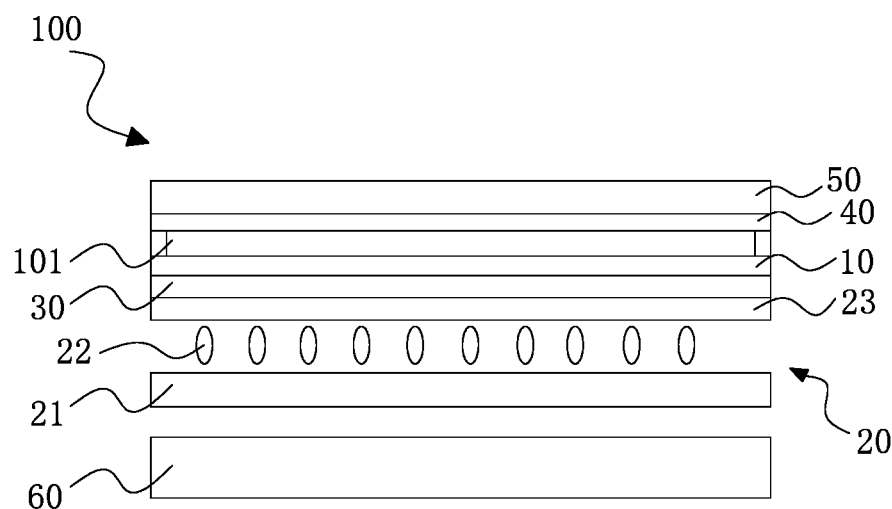
FIG. 3 is schematic structural diagram of a photosensitive color-changing touch control display device provided by the embodiment of the present disclosure.

As shown in FIG. 1 and FIG. 3, an embodiment of the present disclosure provides a photosensitive color-changing touch control display device 100 comprising a display panel 20 and a photosensitive color-changing touch control panel 10. The photosensitive color-changing touch control panel 10 comprises a plurality of touch control electrodes 12 and a plurality of photoresistors 13.

Current liquid crystal display devices are applied in conference scenes. Users want to have a display panel with a touch control function to realize meeting interaction. In the conference scenes and education scenes, users want to have a laser pointer with a visual effect to realize an indicator function. However, traditional TV display modules have difficulty in achieving the above multimedia effects. The embodiment of the present disclosure can solve the above defects. Photoresistors are integrated on a touch control panel. When exposed to ultraviolet light, a resistance of the photoresistor will change, which will cause current in a corresponding region to change. Current information will be collected by a signal processor to control a display panel at a corresponding position to change color to show a trajectory of the laser pointer.

The touch control electrodes 12 are configured to realize the touch control function. The touch control electrodes 12 comprise touch control sensing electrodes and touch control driving electrodes, and the touch control sensing electrodes and the touch control driving electrodes may be disposed in a same layer or on different layers.

When the touch control sensing electrodes and the touch control driving electrodes are arranged in the same layer, the touch control sensing electrodes are disconnected at an intersection with the touch control driving electrodes, and the disconnected touch control sensing electrodes can be connected through a bridge electrode. It can be understood that the disconnected electrodes may also be the touch control driving electrodes.

When the touch control sensing electrodes and the touch control driving electrodes are disposed in different layers, an insulating layer may be disposed between the touch control sensing electrodes and the touch control driving electrodes to achieve a purpose of insulation.

The photoresistor 13 and the touch control electrode 12 may be disposed in the same layer or in different layers. When the photoresistor 13 and the touch control electrode 12 are disposed in different layers, an insulating layer may be disposed between the two for insulation.

In one embodiment, as shown in FIG. 1, the photoresistor 13 and the touch control electrode 12 may be disposed in the same layer to reduce a thickness of the panel.

Specifically, the photoresistor 13 may be disposed in the same layer as one of the touch control sensing electrode and the touch control driving electrode of the touch control electrode 12.

In one embodiment, the photoresistor 13 and the touch control electrode 12 are alternately arranged on a base substrate, so that a functional region of the photosensitive color-changing touch control panel 10 comprises the photoresistor 13 and the touch control electrode 12. The functional region refers to a region irradiated with laser light and a touch control region.

In one embodiment, the photosensitive color-changing touch control display panel 10 further comprises the base substrate 11, and the plurality of photoresistors 13 and the plurality of touch control electrodes 12 are disposed on the base substrate 11. The photosensitive color-changing touch control panel 10 can be bonded to the display panel 20 through an optical adhesive layer.

Specifically, the base substrate 11 of the photosensitive touch control panel 10 is bonded to the display panel 20.

The photoresistor 13 and the touch control electrode 12 may be strip-shaped. In a horizontal direction, the photoresistor 13 and the touch control electrode 12 are alternately arranged on the base substrate 11.

The photoresistor 13 and the touch control electrode 12 may also be other shapes such as square, diamond, and grid, which are not limited here.

In one embodiment, the photosensitive touch control panel 10 may be directly disposed on the display panel 20, that is, the photoresistor 13 and the touch control electrode 12 are directly prepared on a part of a film layer of the display panel 20.

Figure 2:
FIG. 2 is a schematic structural diagram of a photosensitive pattern provided by the embodiment of the present disclosure.

In one embodiment, as shown in FIG. 2, one photoresistor 13 may be composed of a plurality of thin strip-shaped resistance lines arranged in parallel.

The photosensitive color-changing touch control panel 10 further comprises a plurality of electrode terminals 14, and the electrode terminals may be disposed on the base substrate 11.

The electrode terminal 14 is connected to the photoresistor 13, and the electrode terminal 14 may be disposed in a non-functional region of the photosensitive color-changing touch control panel 10.

Figure 4:
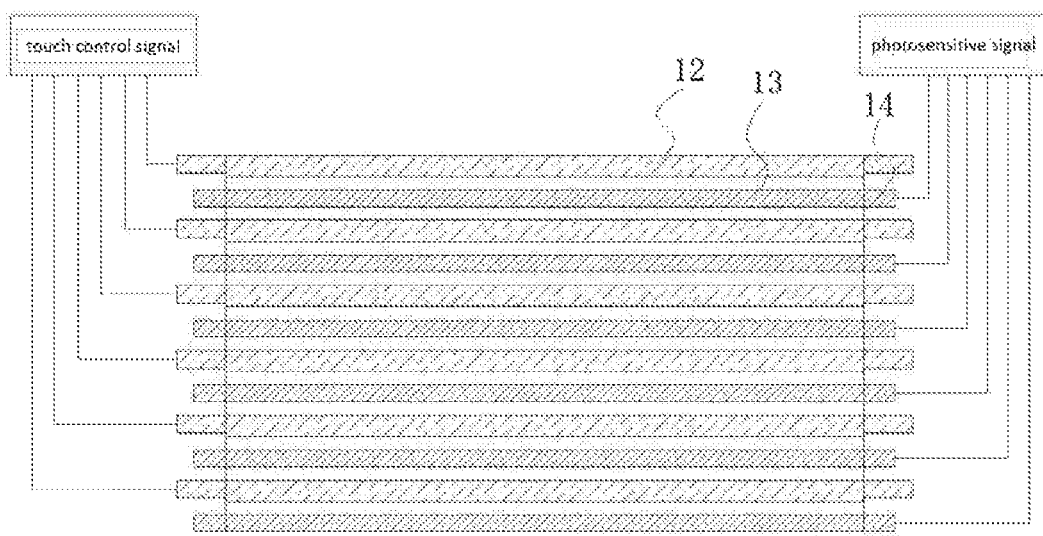
FIG. 4 is a schematic diagram of touch signals and photosensitive signals of the photosensitive color-changing touch control display panel provided by the embodiment of the present disclosure.

As shown in FIG. 4, the touch control electrode 12 is also connected to the electrode terminal 14, and the electrode terminal 14 is connected to an external device to transmit touch signals and photosensitive signals of the photosensitive color-changing touch control panel 10. The touch signal comprises position information and current change information of touch points, and the photosensitive signal comprises point information and current change information of laser irradiation.

The photoresistors 13 is one of ultraviolet photoresistors, visible light photoresistors, or infrared photoresistors.

When the photoresistor 13 is the ultraviolet photoresistor, a material of the photoresistors is cadmium sulfide, cadmium selenide, etc. may be configured to detect ultraviolet rays.

When the photoresistor 13 is the infrared photoresistor, the material of the photoresistors is lead sulfide, lead telluride, lead selenide, and indium antimonide, which is configured to detect infrared rays.

The photosensitive color-changing touch control panel can be applied to a display panel, and can be of in cell or on cell structures. The display panel can be a liquid crystal display panel or an organic light-emitting diode (OLED) display panel.

In one embodiment, a liquid crystal display panel and on cell structure are used as examples. As shown in FIG. 3, the display panel 20 comprises an array substrate 21, a liquid crystal layer 22, and a color film substrate 23 that are sequentially laminated. The photosensitive color-changing touch control panel 10 is disposed on the color film substrate 23.

In one embodiment, the photosensitive color-changing touch control panel 10 can be bonded to the display panel 20 through the optical adhesive layer. Specifically, the base substrate 11 of the photosensitive color-changing touch control panel 10 is bonded to the color film substrate 23 of the display panel 20.

In one embodiment, the photosensitive color-changing touch control panel 10 may be of an in cell structure, that is, the photosensitive color-changing touch control panel may be embedded inside the display panel 20, and the photoresistor and the touch control electrode may be disposed in the array substrate 21 or the color film substrate 23 of the display panel 20.

Figure 5:
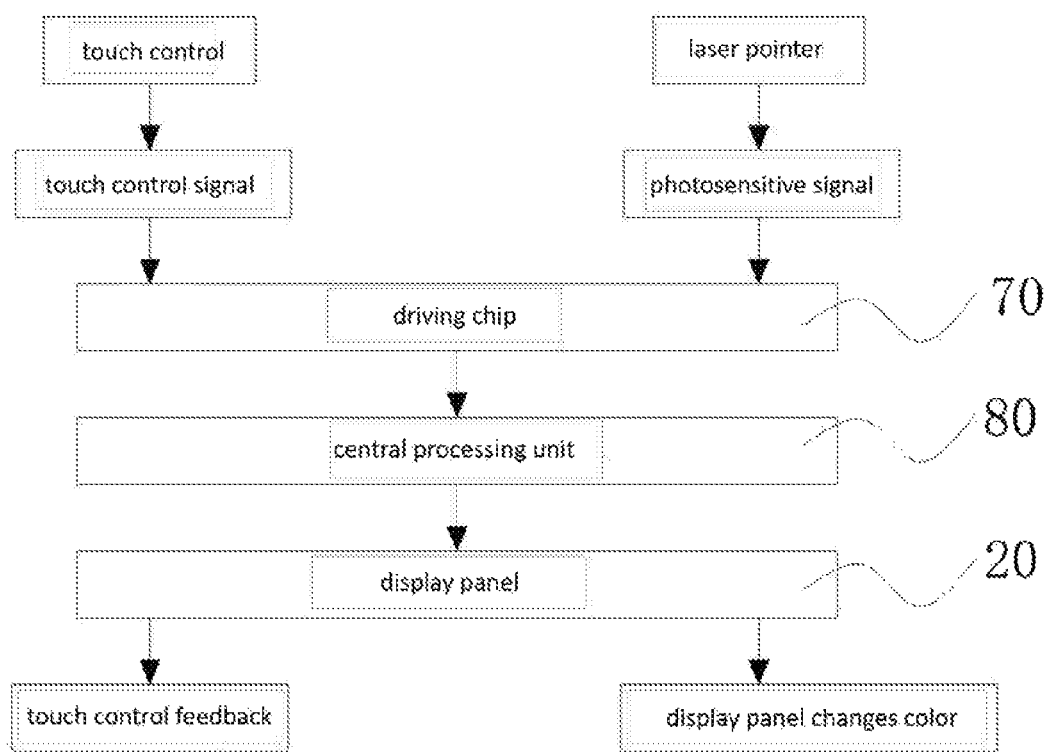
FIG. 5 is a signal processing flowchart of the photosensitive color-changing touch display device provided by the embodiment of the present disclosure.

As shown in FIG. 5, the photosensitive color-changing touch control display device 100 further comprises a driving chip 70 and a central processing unit 80 electrically connected to the driving chip 70, and the central processing unit 80 is further connected to the display panel 20. The driving chip 70 is configured to obtain a photosensitive signal (namely a current change signal) of the photoresistor 13, and the central processing unit 80 controls the display panel 20 at a corresponding position to change color according to the current change signal.

When the resistance of the photoresistor 13 changes, the driving chip 70 transmits the obtained current change signal to the central processing unit 80, and the central processing unit 80 controls the display panel 20 corresponding to a region where a current change occurs to change color. For example, when an ultraviolet laser pointer is irradiated onto the functional region on the photosensitive color-changing touch panel 10, the resistance of the photoresistor 13 at an irradiation position changes, so that current changes at a position of the photoresistor 13. The driving chip 70 obtains the position where current change occurs, and feeds back the current change signal to the central processing unit 80, and the central processing unit 80 controls the display panel at the current change position to change the color. For example, controlling the display panel at the position to display red, so that naked eyes see an irradiation region of the laser pointer displaying red. Therefore, an irradiation trajectory of the laser pointer can be obtained instantly.

When the plurality of photoresistors 13 on the photosensitive color-changing touch control panel 10 are not irradiated with laser light, the resistance of the photoresistor 13 is a fixed value F, and current change at a position of the photoresistor 13 monitored by the driving chip 70 is zero, that is, the monitored current value remains unchanged. At this time, the central processing unit will not issue a control command to the display panel 20, and the display panel 20 performs normal touch control display. When the laser pointer is irradiated on the photoresistor 13 at a certain position, the photoresistor changes its resistance due to the laser irradiation, and the resistance of the photoresistor is F', the driving chip 70 monitors that the current value at the position changes, and a current change amount can be preset to be ΔI. When an actual monitored current value change exceeds the ΔI range value, the central processing unit controls the display panel 20 corresponding to the position to change the display color, that is, the region corresponding to the position irradiated by the laser in real time is displayed in red.

In one embodiment, a touch control chip may be integrated with a photosensitive chip, that is, the driving chip 70 may also obtain the touch signal of the touch control electrode 12, so that the touch signal feeds back to the central processing unit 80, and the central processing unit 80 controls the display panel 20 to make a touch feedback display.

In one embodiment, the photosensitive color-changing touch control display device 100 further comprises a touch control driving chip, the touch control driving chip is connected to the touch control electrodes 12 and the central processing unit 80, and the touch control driving chip is configured to obtain touch signals from the touch control electrodes, so that the touch signal feeds back to the central processing unit 80, and the central processing unit 80 controls the display panel 20 to make a touch feedback display.

As shown in FIG. 3, the photosensitive color-changing touch control display device 100 further comprises a polarizer 40 disposed on the photosensitive color-changing touch panel 10, an air interval 101 is defined between the polarizer 40 and the photosensitive color-changing touch panel 10, and the polarizer 40 is configured to reduce mixed light entering the air interval 101.

A backlight module 60 is disposed below the display panel 20 and is configured to provide backlight.

Two opposite sides of the display panel 20 are respectively provided with an upper polarizer 30 and a lower polarizer. The upper polarizer 30 is disposed between the color film substrate 23 and the photosensitive color-changing touch panel 10. The upper polarizer 30 may be a polarizer with a wide viewing angle, so that the backlight light has a wider viewing angle after being emitted from a display surface. Therefore, in conference scenes or educational scene under ambient light, meeting interaction is realized with a good wide-angles visibility.

The polarizer 40 is covered by a protective cover plate 50, and a light-emitting surface of the protective cover plate 50 can be treated with anti-glare (AG). The light-emitting surface of the protective cover plate 50 is processed with fine unevenness to prevent light from directly entering the eyes, thereby effectively reducing glare and reflection, and improving display effect.

The photoresistor is disposed on a substrate with a touch control function to realize a multimedia integrated display panel with a photosensitive color-changing function and a touch control function. When the photoresistor is irradiated by the laser pointer and a resistance changes, by collecting current change information, the driving chip feeds back a position where current change occurs to the central processing unit, and the central processing unit controls the display panel at a corresponding position to change colors. Therefore, a trajectory of a laser pointer irradiation is revealed, and multifunctional applications of liquid crystal display devices in the conference scene or the education scenes are realized.

In the above embodiments, the description of each embodiment has its own emphasis. For a part that is not detailed in an embodiment, referring to the related descriptions of other embodiments.

It can be understood that for those of ordinary skill in the art, equivalent replacements or changes can be made according to the technical solutions and inventive concepts of the present disclosure, and all such changes or replacements should fall within the protection scope of the claims appended to the present disclosure.

What is claimed is:

1. A photosensitive color-changing touch control display device, comprising:
   a display panel;
   a photosensitive color-changing touch control panel comprising a plurality of touch control electrodes and a plurality of photoresistors;
   a driving chip electrically connected to the photoresistors to obtain a current change signal of the photoresistors; and
   a central processing unit electrically connected to the driving chip and the display panel;
   wherein when a resistance of the photoresistor changes, the driving chip transmits the obtained current change signal to the central processing unit, and the central processing unit controls the display panel corresponding to a region where a current change occurs to change color;
   the photosensitive color-changing touch control display device comprises a polarizer disposed on the photosensitive color-changing touch control panel;
   the photoresistors and the touch control electrodes are disposed on a same layer;
   an air interval is defined between the polarizer and the photosensitive color-changing touch panel;
   the polarizer is a polarizer with a wide viewing angle; and the polarizer is covered by a protective cover plate with an uneven structure;
   the plurality of touch control electrodes and the plurality of photoresistors are strip-shaped; and
   in a horizontal direction, the photoresistors and the touch control electrodes are alternately arranged on the base substrate.

2. The photosensitive color-changing touch control display device as claimed in claim 1, wherein the photosensitive color-changing touch control display panel comprises a base substrate disposed on the display panel, and the plurality of touch control electrodes and the plurality of photoresistors are disposed on the base substrate.

3. The photosensitive color-changing touch control display device as claimed in claim 1, wherein the driving chip is connected to the touch control electrodes to obtain touch signals from the touch control electrodes.

4. The photosensitive color-changing touch control display device as claimed in claim 1, wherein the photosensitive color-changing touch control display device comprises a touch control driving chip, the touch control driving chip is connected to the touch control electrodes and the central processing unit, and the touch control driving chip is configured to obtain touch signals from the touch control electrodes.

5. The photosensitive color-changing touch control display device as claimed in claim 3, wherein the central processing unit controls the display panel to make a touch feedback display.

6. The photosensitive color-changing touch control display device as claimed in claim 1, wherein the display panel comprises an array substrate and a color film substrate that are oppositely arranged, and the photoresistors and the touch control electrodes are disposed in the array substrate or the color film substrate of the display panel.

7. A photosensitive color-changing touch control display device, comprising:
   a display panel;
   a photosensitive color-changing touch control panel comprising a plurality of touch control electrodes and a plurality of photoresistors;
   a driving chip electrically connected to the photoresistors to obtain a current change signal of the photoresistors; and
   a central processing unit electrically connected to the driving chip and the display panel;
   wherein when a resistance of the photoresistor changes, the driving chip transmits the obtained current change signal to the central processing unit, and the central processing unit controls the display panel corresponding to a region where a current change occurs to change color;
   the photoresistors and the touch control electrodes are disposed on a same layer;
   an air interval is defined between the polarizer and the photosensitive color-changing touch panel;
   the polarizer is a polarizer with a wide viewing angle; and the polarizer is covered by a protective cover plate with an uneven structure;
   the plurality of touch control electrodes and the plurality of photoresistors are strip-shaped; and in a horizontal direction, the photoresistors and the touch control electrodes are alternately arranged on the base substrate.

8. The photosensitive color-changing touch control display device as claimed in claim 7, wherein the photosensitive color-changing touch control display panel comprises a base substrate disposed on the display panel, and the plurality of touch control electrodes and the plurality of photoresistors are disposed on the base substrate.

9. The photosensitive color-changing touch control display device as claimed in claim 7, wherein the photosensitive color-changing touch control display device comprises a polarizer disposed on the photosensitive color-changing touch control panel.

10. The photosensitive color-changing touch control display device as claimed in claim 7, wherein the driving chip is connected to the touch control electrodes to obtain touch signals from the touch control electrodes.

11. The photosensitive color-changing touch control display device as claimed in claim 7, wherein the photosensitive color-changing touch control display device comprises a touch control driving chip, the touch control driving chip is connected to the touch control electrodes and the central processing unit, and the touch control driving chip is configured to obtain touch signals from the touch control electrodes.

12. The photosensitive color-changing touch control display device as claimed in claim 10, wherein the central processing unit controls the display panel to make a touch feedback display.

13. The photosensitive color-changing touch control display device as claimed in claim 7, wherein the display panel comprises an array substrate and a color film substrate that are oppositely arranged, and the photoresistors and the touch control electrodes are disposed in the array substrate or the color film substrate of the display panel.

14. The photosensitive color-changing touch control display device as claimed in claim 7, wherein the photoresistors is one of ultraviolet photoresistors, visible light photoresistors, or an infrared photoresistors.

15. The photosensitive color-changing touch control display device as claimed in claim 14, wherein a material of the photoresistors is one of cadmium sulfide, cadmium selenide, lead sulfide, lead telluride, lead selenide, or indium antimonide.

16. The photosensitive color-changing touch control display device as claimed in claim 7, wherein a backlight module is disposed below the display panel.

\* \* \* \* \*